Patented Feb. 17, 1942

2,273,338

UNITED STATES PATENT OFFICE 2,273,338

PRODUCTION OF CATALYTIC MATERIAL

Charles L. Thomas, Chicago, Ill., assignor to Universal Oil Products Company, Chicago, Ill., a corporation of Delaware No Drawing. Application April 3, 1939, Serial No. 265,761

10 Claims. (Cl. 252—232)

This invention relates particularly to a method of preparing an adsorbent, porous support for use in the production of catalytic material employed in hydrocarbon conversion reactions.

Apart from the requirement of being able to specifically accelerate particular types of reactions, catalysts employed in hydrocarbon conversions must possess certain definite structural characteristics which render them more or less resistant to deterioration under severe conditions of temperature which have to be employed in order to obtain economically desirable yields and at desirable rates. The search for supports for catalytically active substances has brought forth many refractory substances such as various silicates both natural and synthetic, various forms of oxides such as alkaline earth oxides and such materials as alumina. While a large number of substances have been found which are highly infusible, not all such substances possess in addition a sufficient degree of porosity and resistance to change in form coupled with desired chemical properties to permit their general use.

The present invention is particularly concerned with a method of producing a very definite form of aluminum oxide useful as a support for catalysts specific in selectively accelerating reactions of dehydrogenation among various types of hydrocarbons. Numerous elements and their compounds have been found to have a specific dehydrogenating effect but many of these cannot be used in concentrated form since they tend to undergo far reaching changes in structure at the temperatures required for the dehydrogenation reactions and best results are obtained when they are utilized on porous supports. Paraffinic hydrocarbons may undergo successive reactions of dehydrogenation involving the formation of mono-olefins, di-olefins, acetylenes, naphthenes, hydro-aromatics, and aromatics, the end products being theoretically the aromatics in this chain of reactions. By utilizing certain dehydrogenation catalysts on the particular support which forms the principal feature of the present invention, different hydrocarbon dehydrogenation reactions may be brought about with a high degree of efficiency in regard to original catalyst activity, long catalyst life, and ease of reactivating such catalytic material after carbonization has occurred.

In one specific embodiment the present invention comprises precipitating hydrated aluminum oxide by mixing solutions of sodium aluminate and ammonium chloride, filtering, washing with water to remove water soluble impurities, drying, forming into particles, and calcining at a temperature of the order of 300–500° C. whereby to produce active formed particles of aluminum oxide suitable for use as a carrier in the production of supported catalytic materials utilizable in hydrocarbon conversion reactions.

The reaction occurring when aqueous sodium aluminate solution is added to a preferably hot solution of ammonium chloride according to the process of the present invention, may be represented by the equation:

$$NaAlO_2 + NH_4Cl \rightarrow NH_3 + AlO.OH + NaCl$$

Ammonia is evolved and sodium chloride is formed during the precipitation of the hydrated alumina which is later washed with water to remove sodium chloride. The resulting purified mono-hydrated aluminum oxide, which may be indicated as $AlO.OH$ or $Al_2O_3.H_2O$, is converted by drying and calcining into active aluminum oxide which may be used as a basis not only for dehydrogenation catalysts but for various other types of catalytic material useful in accelerating other hydrocarbon conversion reactions such as cracking, reforming, isomerization, etc.

While the present invention is more particularly concerned with the production of a special type of catalyst support utilizable in the manufacture of catalysts which foster dehydrogenation of straight chain or aliphatic hydrocarbons with or without ring closure, it is to be understood that the particular catalyst support which forms the principal feature of this invention may be used along with any type of substances which foster these reactions, or such reactions as the dehydrogenation of naphthenes to form aromatics, for example, nickel, chromia, or other materials. It is further comprised within the scope of the invention to apply the various types of dehydrogenating catalysts to hydrocarbons of any boiling range which are amenable to treatment.

The particular support for dehydrogenation catalysts which forms the principal feature of the present invention may be formed by slowly mixing an aqueous solution of sodium aluminate with a boiling solution of ammonium chloride, filtering and water washing the precipitated hydrated alumina to remove water soluble impurities, drying, forming into particles, and calcining at a temperature of the order of 300–500° C. There is thus produced an active adsorbent alumina which may be utilized as such, or may be impregnated by metals or metal oxides having activity for catalyzing hydrocarbon conversion reactions.

Alumina prepared as indicated above has been found of outstanding value as a carrier for certain particular types of catalysts which promote dehydrogenation and aromatization reactions. These catalysts are in general the oxides, and more particularly the lower oxides, of the elements occurring in the left-hand columns of groups 4, 5, and 6 of the periodic table. In group 4 the elements titanium, zirconium, cerium, hafnium, and thorium fall in this category; in group 5, vanadium, columbium, and tantalum; and in group 6, chromium, molybdenum, tungsten, and uranium. The oxides of these elements may be developed on the surface and in the pores of the preferred carrier by various methods including the primary absorption from solution of salts which yield oxides on ignition such as carbonates, and nitrates, or the precipitation on the carrier granules of hydroxides of the various elements by the addition of ammonium or alkali metal hydroxides to solutions of salts in which the aluminum oxide granules are suspended. After the usual steps of calcination to remove acid radicals or water, the composite catalysts are then preferably subjected to reduction with hydrogen or other reducing gases at temperatures necessary to produce the lower oxides, which temperatures will vary with the nature of the oxides themselves.

It should be emphasized that in the field of catalysis there have been very few rules evolved which will enable the prediction of what materials will catalyze a given reaction. Most of the catalytic work has been done on a purely empirical basis, even though at times certain groups of elements or compounds have been found to be more or less equivalent in accelerating certain types of reactions.

The following examples are given to show the type of results normally obtainable in the practice of the process, although not with the intention of imposing exactly corresponding limitations upon the generally broad scope of the invention.

EXAMPLE I

A solution of 328 parts by weight of sodium aluminate in 1000 volumes of water was added gradually, during 3 hours, to an efficiently stirred solution containing 300 parts by weight of ammonium chloride and 1000 volumes of water heated to boiling. During the addition of the sodium aluminate solution, ammonia was evolved copiously and hydrated aluminum oxide was precipitated. After mixing of the total reactants the precipitate was filtered off, washed with water until free from chloride, and dried. A yield of 179 parts by weight of powdered aluminum oxide was obtained and later calcined at 450° C. for 4 hours.

Thirty-five parts by weight of the above mentioned alumina was placed in a solution consisting of one part by weight of potassium dichromate in 100 volumes of water. The resulting mixture was heated to boiling, then cooled, washed with 100 volumes of cold water, and dried.

Alumina as formed by the process of this invention and that activated by potassium dichromate were utilized as catalysts in reforming a Pennsylvania straight run gasoline having a 48 octane number and an A. P. I. gravity of 61°. These reforming runs were continued during three 24-hour periods at 500° C. under atmospheric pressure using a liquid space velocity of 0.25. Results of these runs in the presence of the alumina and of the alumina activated by potassium dichromate are compared in Table I with results similarly obtained in the presence of two other samples of alumina formed: (1) by treating aluminum sulfate with sodium hydroxide, filtering, washing and drying the precipitated alumina hydroxide, and (2) by heating aluminum acetate in air at a temperature in the order of 500° C. until organic material was expelled and white alumina remained.

TABLE I

Catalytic reforming of Pennsylvania straight run gasoline

Average increase in octane number during three 24-hr. periods.

| Period Nos | 1 | 2 | 3 |
| --- | --- | --- | --- |
| Catalysts: | | | |
| Alumina made by the process of the invention | 14 | 17 | 14 |
| The above alumina activated by potassium dichromate | 19 | 17 | 12 |
| Alumina from aluminum sulfate | 6 | — | 11 |
| Alumina from aluminum acetate | 2 | — | 5 |

These runs, made without reactivation of the catalysts during the 72 hours on test, indicate initially higher activity for the alumina activated by potassium dichromate over that of the carrier alone, or of that of the other two samples of alumina. Although the reforming reaction is not understood clearly or completely, it apparently involves dehydrogenation reactions as evidenced by formation of gas, of which a major part was hydrogen. The decrease observed in the activity of the potassium dichromate-alumina catalyst may be due to greater contamination during use by carbonaceous materials removable by proper reactivation treatment.

EXAMPLE II

As an instance of the superior value of alumina produced by the interaction of ammonium chloride and sodium aluminate by the process of this invention, it was used in comparison with a commercial type of aluminum oxide as a support for about 5% by weight of chromium sesquioxide to form a catalyst which was employed in dehydrogenating butanes to produce butenes. At a temperature of 550° C., under substantially atmospheric pressure with a time of contact of 4–6 seconds, the catalyst prepared from the preferred aluminum oxide gave continuously for periods of over 200 hours approximately 25% conversion based on the theoretical equilibrium under the conditions of temperature and pressure specified, while the catalyst resulting from the use of a commercial grade of aluminum oxide supporting the same percentage of chromium sesquioxide showed on continuous running only 5% of the equilibrium dehydrogenating effect.

The nature of the process of the present invention and its practical application are evident from the preceding specification and examples given, although neither section is intended to limit unduly its generally broad scope.

I claim as my invention:

1. A process for producing catalytic material which comprises mixing solutions of sodium aluminate and ammonium chloride to precipitate hydrated aluminum oxide and combining with the aluminum oxide a hydrocarbon dehydrogenating catalyst comprising an oxide of an element from the left-hand columns of groups 4, 5 and 6 of the periodic table.

2. A process for producing catalytic material which comprises mixing solutions of sodium aluminate and ammonium chloride to precipitate hydrated aluminum oxide and combining with the aluminum oxide an oxide of an element from the left-hand column of group 4 of the periodic table.

3. A process for producing catalytic material which comprises mixing solutions of sodium aluminate and ammonium chloride to precipitate hydrated aluminum oxide and combining with the aluminum oxide an oxide of an element from the left-hand column of group 5 of the periodic table.

4. A process for producing catalytic material which comprises mixing solutions of sodium aluminate and ammonium chloride to precipitate hydrated aluminum oxide and combining with the aluminum oxide an oxide of an element from the left-hand column of group 6 of the periodic table.

5. A process for producing catalytic material which comprises mixing solutions of sodium aluminate and ammonium chloride to precipitate hydrated aluminum oxide and combining a chromium oxide with the aluminum oxide.

6. As a composition of matter, a solid catalytic material comprising the aluminum oxide reaction product of solutions of sodium aluminate and ammonium chloride, having incorporated therein a hydrocarbon dehydrogenating catalyst comprising an oxide of an element from the left-hand columns of groups 4, 5 and 6 of the periodic table.

7. As a composition of matter, a solid catalytic material comprising the aluminum oxide reaction product of solutions of sodium aluminate and ammonium chloride, having incorporated therein an oxide of an element from the left-hand column of group 4 of the periodic table.

8. As a composition of matter, a solid catalytic material comprising the aluminum oxide reaction product of solutions of sodium aluminate and ammonium chloride, having incorporated therein an oxide of an element from the left-hand column of group 5 of the periodic table.

9. As a composition of matter, a solid catalytic material comprising the aluminum oxide reaction product of solutions of sodium aluminate and ammonium chloride, having incorporated therein an oxide of an element from the left-hand column of group 6 of the periodic table.

10. As a composition of matter, a solid catalytic material comprising the aluminum oxide reaction product of solutions of sodium aluminate and ammonium chloride, having a chromium oxide incorporated therein.

CHARLES L. THOMAS.